(12) United States Patent
Rublee et al.

(10) Patent No.: US 10,122,995 B2
(45) Date of Patent: Nov. 6, 2018

(54) SYSTEMS AND METHODS FOR GENERATING AND DISPLAYING A 3D MODEL OF ITEMS IN A WAREHOUSE

(71) Applicant: X Development LLC, Mountain View, CA (US)

(72) Inventors: Ethan Rublee, Mountain View, CA (US); John Zevenbergen, Saratoga, CA (US)

(73) Assignee: X Development LLC, Mountain View, CA (US)

( * ) Notice: Subject to any disclaimer, the term of this patent is extended or adjusted under 35 U.S.C. 154(b) by 78 days.

(21) Appl. No.: 15/273,465

(22) Filed: Sep. 22, 2016

(65) Prior Publication Data

US 2018/0084242 A1    Mar. 22, 2018

(51) Int. Cl.
| | |
|---|---|
| *H04N 13/279* | (2018.01) |
| *G06K 9/00* | (2006.01) |
| *G06K 9/62* | (2006.01) |
| *G06T 17/00* | (2006.01) |
| *G06T 19/00* | (2011.01) |

(52) U.S. Cl.
CPC ....... *H04N 13/279* (2018.05); *G06K 9/00671* (2013.01); *G06K 9/6215* (2013.01); *G06T 17/00* (2013.01); *G06T 19/003* (2013.01); *G06T 2200/08* (2013.01); *G06T 2215/16* (2013.01); *Y10S 901/01* (2013.01); *Y10S 901/47* (2013.01)

(58) Field of Classification Search
CPC ... H04N 13/0278; G06T 17/00; G06T 19/003; G06T 2215/16; G06T 2200/08; G06K 9/6215; G06K 9/00671; Y10S 901/47; Y10S 901/01
See application file for complete search history.

(56) References Cited

U.S. PATENT DOCUMENTS

| | | | |
|---|---|---|---|
| 2010/0013931 A1 | 1/2010 | Golan et al. | |
| 2010/0061595 A1 | 3/2010 | Baan et al. | |
| 2014/0184760 A1* | 7/2014 | Kato | H04N 13/0022 348/52 |
| 2014/0253546 A1* | 9/2014 | Hickman | G09G 5/00 345/419 |
| 2014/0267776 A1 | 9/2014 | Duthu | |
| 2015/0347840 A1* | 12/2015 | Iida | H04N 13/0203 382/103 |
| 2016/0146789 A1 | 5/2016 | Coyne et al. | |

(Continued)

*Primary Examiner* — Tat C Chio
(74) *Attorney, Agent, or Firm* — McDonnell Boehnen Hulbert & Berghoff LLP

(57) ABSTRACT

An example method involves receiving, from at least one camera located in an environment, a plurality of images captured during a first time interval. The method also involves selecting one or more of the plurality of images having a movable platform supporting one or more objects. The method further involves generating a three-dimensional model of the movable platform supporting the one or more objects. The method yet further involves updating the three-dimensional model based on one or more images captured during a second time interval. The method still further involves presenting the three-dimensional model via a display of a user interface, and providing an option to view a history of the three-dimensional model such that the three-dimensional model remains in a fixed position on the display during a viewing of the history.

21 Claims, 15 Drawing Sheets

(56) References Cited

U.S. PATENT DOCUMENTS

2016/0239021 A1    8/2016  Pous et al.
2017/0282071 A1*  10/2017  Kurabayashi .......... H04N 5/765
2017/0316253 A1*  11/2017  Phillips .............. G06K 9/00208

* cited by examiner

Position A

SYSTEMS AND METHODS FOR GENERATING AND DISPLAYING A 3D MODEL OF ITEMS IN A WAREHOUSE

BACKGROUND

One or more robotic devices and/or other actors can move throughout a storage environment to perform actions related to sorting, storing, and shipping various items. One example storage environment is a warehouse, which may have rows of storage racks on which items may be stored. In some cases, these items may be stored on pallets, allowing for easier transportation around the warehouse by the robotic devices.

SUMMARY

Example methods, systems, and devices may provide the ability to view the history of a movable platform over time, as the movable platform is transported within a warehouse. An example movable platform may be a pallet, upon which items are stored, added, and removed over time. The methods, systems, and devices may include a computing system configured to receive images of the movable platform, and generate a three-dimensional model that can show each side of the movable platform. The images may be received from a plurality of cameras located within the warehouse that may capture images of the movable platform as it moves throughout the warehouse. In this way, various cameras can have views of the different sides of the movable platform, so that a complete picture of the platform can be captured. The images may captured over time (i.e., not simultaneously or all at the same moment), which can help facilitate capturing the full view of the platform. Further, the three-dimensional model may be updated as time progresses and additional images are captured. These updates may allow the history of the movable platform to be presented to and viewed by a user. The history may show the movable platform at each point in time that particular events happen to the movable platform, such as adding or removing objects from the platform, for example. The history may also indicate when and where any significant events happened, allowing a user to quickly determine when, where, how, and/or why any changes to the movable platform occurred. Some benefits of presenting the history of a movable platform as described in this disclosure may include automatically indicating and calling out moments when unintended actions occur, to allow a user to quickly scan through and address any errors or unintended actions that may have taken place. Further, a user may be able to quickly determine when, where, and how damage to the movable platform occurred or to find a misplaced movable platform or object, for example.

In one example, a method is disclosed. The method involves receiving, from at least one camera located in an environment, a plurality of images captured during a first time interval. The method also involves selecting one or more of the plurality of images, wherein the one or more selected images include a movable platform supporting one or more objects as the movable platform is transported within the environment. The method further involves generating, based on the one or more selected images, a three-dimensional model of the movable platform supporting the one or more objects. The method yet further involves updating the three-dimensional model based on one or more images captured during a second time interval, wherein the second time interval begins later than the first time interval. The method still further involves presenting the three-dimensional model via a display of a user interface, and providing an option, via the user interface, to view a history of the three-dimensional model including the first time interval and the second time interval such that the three-dimensional model remains in a fixed position on the display.

In another example, a system is disclosed. The system includes a movable platform configured to support one or more objects as the movable platform is transported within an environment. The system also includes at least one camera located in the environment. The system further includes a computing system, wherein the computing system is configured to receive, from the plurality of cameras, a plurality of images captured during a first time interval. The computing system is further configured to select one or more of the plurality of images, wherein the one or more selected images include the movable platform. The computing system is further configured to generate, based on the one or more selected images, a three-dimensional model of the movable platform supporting the one or more objects. The computing system is further configured to update the three-dimensional model based on one or more images captured during a second time interval, wherein the second time interval begins later than the first time interval. The computing system is yet further configured to present the three-dimensional model via a display of a user interface of the computing system, and provide an option, via the user interface, to view a history of the three-dimensional model including the first time interval and the second time interval such that the three-dimensional model remains in a fixed position on the display.

In a third example, a non-transitory, computer-readable medium is disclosed. The non-transitory, computer-readable medium includes program instructions, that when executed cause a computing device to perform a set of acts. The set of acts includes receiving, from at least one camera located in an environment, a plurality of images captured during a first time interval. The set of acts also includes selecting one or more of the plurality of images, wherein the one or more selected images include a movable platform supporting one or more objects as the movable platform is transported within the environment. The set of acts further includes generating, based on the one or more selected images, a three-dimensional model of the movable platform supporting the one or more objects. The set of acts yet further includes updating the three-dimensional model based on one or more images captured during a second time interval, wherein the second time interval begins later than the first time interval. The set of acts still further includes presenting the three-dimensional model via a display of a user interface of the computing device, and providing an option, via the user interface, to view a history of the three dimensional model including the first time interval and the second time interval such that the three-dimensional model remains in a fixed position on the display.

In another example, a control system is described. The control system includes means for receiving, from at least one camera located in an environment, a plurality of images captured during a first time interval. The control system also includes means for selecting one or more of the plurality of images, wherein the one or more selected images include a movable platform supporting one or more objects as the movable platform is transported within the environment. The control system further includes means for generating, based on the one or more selected images, a three-dimensional model of the movable platform supporting the one or more objects. The control system still further includes means for updating the three-dimensional model based on one or more images captured during a second time interval, wherein the second time interval begins later than the first time interval. The control system still further includes means for presenting the three-dimensional model via a display of a user interface, and providing an option, via the user interface, to view a history of the three dimensional model including the first time interval and the second time interval such that the three-dimensional model remains in a fixed position on the display.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1A:
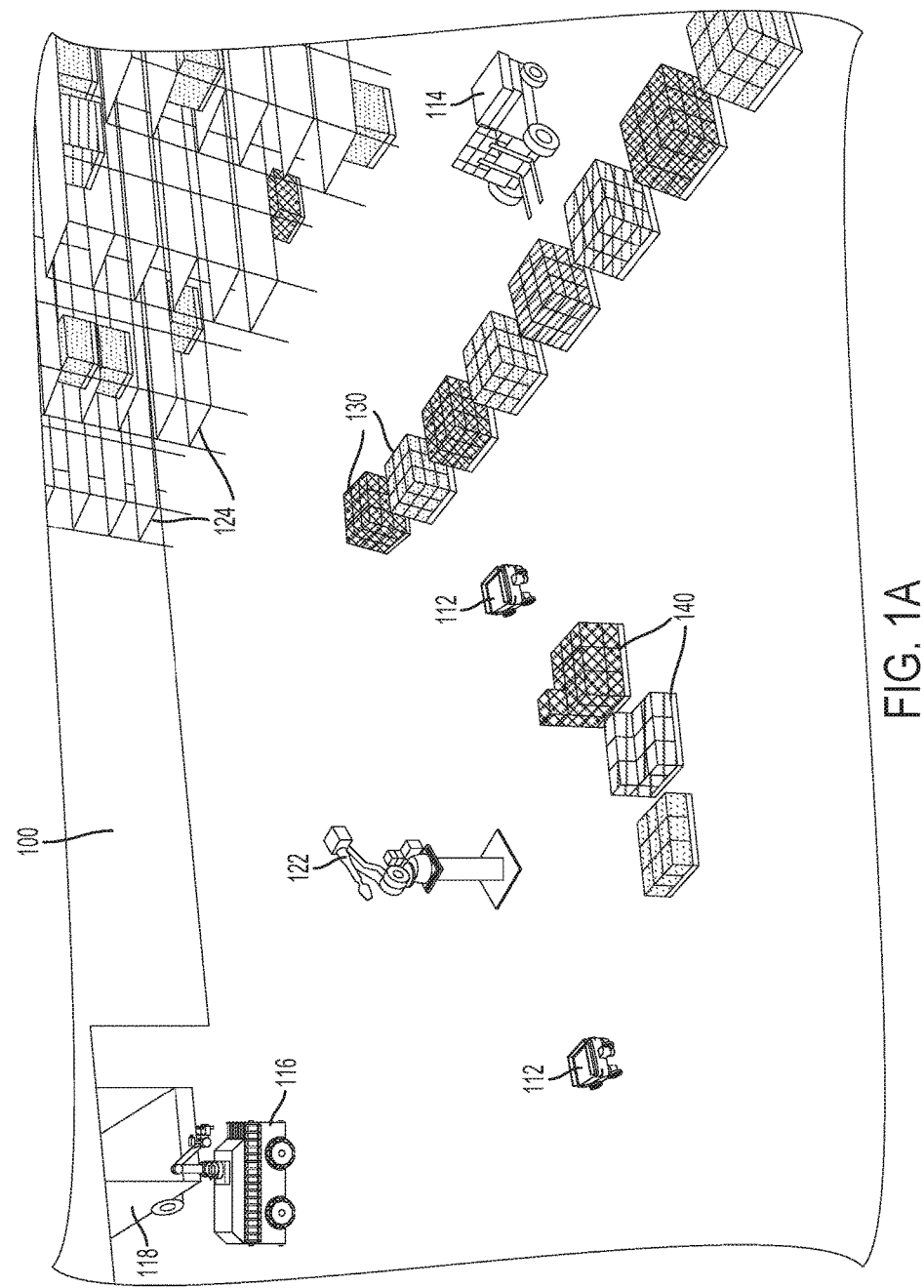
FIG. 1A illustrates a robotic fleet, according to an example implementation.

Example methods, systems, and devices are described herein. Any example embodiment or feature described herein is not to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

A centralized computing system may store information corresponding to the robotic devices, pallets, and other items within the environment, and may transmit instructions to the robotic devices to carry out various tasks. The stored information may include the number of items on the pallet, the shape and size of the items and pallet, the type of item, and the location of the robotic devices and pallets within the warehouse, and any instructions that have been or will be transmitted to the robotic devices, for example. The centralized computing system may include information for all pallets and devices operating in the warehouse, such that the centralized system contains an inventory of the warehouse.

During normal use of a warehouse, pallets and items are routinely moved from one location to another. In many cases, objects may be removed or added to a pallet at various times and in various locations. In a warehouse that includes automated robotic devices, humans may not be present and/or may not easily notice unexpected events or failures. The present disclosure may facilitate better management of a warehouse environment, allowing a human operator to more easily notice, diagnose, and fix errors that occur. To facilitate this, a user may wish to have a record of all the changes to a given pallet, and may benefit from viewing a history of the pallet and objects included thereon over time. A user interface may allow a user to see when and how each object is removed or added to the pallet, and information about any deformations or problems that occur with the pallet, objects, robotic device, or background items.

An example warehouse may be a fulfillment warehouse in which objects are selected, sorted, and packaged for shipment to customers. Objects may be arranged or organized within the warehouse to improve efficiency of this process based on customer demand, product size, weight, shape, or other characteristic. Further, each object and/or pallet may include a visual identifier such as a barcode or Quick Response (QR) code that identifies the object and/or pallet.

A computer-based warehouse management system (WMS) may be implemented for the warehouse. The WMS may include a database for storing information related to the items and pallets, as well as one or more actors operating in the warehouse. For instance, the WMS may include information about the location of each item, pallet, and actor. This information may be used to coordinate the actors to allow them to carry out one or more functions, such as fulfilling an order for a customer. It may also be used to build and/or maintain an inventory of the warehouse. The WMS may also be configured to perform functions described below with respect to generating and displaying a three-dimensional model.

The warehouse may include a plurality of cameras positioned at different locations, including fixed to the structures of the warehouse such as walls and shelves, and fixed to robotic devices operating within the warehouse. The cameras may be used for navigation, object avoidance, object location, and various other warehouse management purposes.

Each camera may capture images of robotic devices, pallets, and objects that cross through the camera's field of view. These images may be transmitted to the WMS for processing. In some cases, the cameras may provide a continuous or near continuous stream of captured images to the WMS. During processing, the WMS may determine which images correspond to a particular pallet. For instance, as the pallet moves through the warehouse, several cameras may have a view of the pallet at different times (sometimes multiple cameras at the same time), and may capture images of the pallet. The images may be organized based on the time they were captured, to create a visual history of the pallet over time.

In some examples, the WMS may take a grouping of images captured over a first time period, which may be a matter of minutes, seconds, or less. The WMS may then build a three-dimensional model of the pallet and any objects it is carrying based on data from the captured images. The WMS may use image data from cameras that have multiple views of the pallet, so that a full three-dimensional model may be generated.

Then, as time progresses and the pallet is transported throughout the warehouse, one or more objects may be added or removed, or the pallet and objects included thereon may change in some respect (e.g., shifting position, deformation, etc.). Images of the pallet and objects captured at this time may be used by the WMS to update the three-dimensional model. Updating the three-dimensional model may include partial changes to the model based on the images. For example, where the model of a pallet includes a side A, and a camera located in the warehouse captures a side A of the pallet, the model may be updated to include the new information regarding the side A captured by the camera. In this manner, a full encompassing view of the pallet need not be captured in order to update the model.

In some examples, the WMS may present the three-dimensional model via a user interface. The user interface may allow a user to view the history of the pallet over time, and see when, where, how, and why changes to the pallet occurred. The WMS may also perform some analysis of the model over time to flag any points where the model changes by a threshold amount. For instance, the WMS may flag any time when an object is removed or added to the pallet. These flagged points in time may be presented via the user interface to allow a user to easily identify any points of interest in the history of the pallet.

II. Example Environment

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Example embodiments may involve a robotic fleet deployed within a warehouse environment. More specifically, a combination of fixed and mobile components may be deployed within the environment to facilitate automated processing of boxes, packages, or other types of objects. Example systems may involve automated loading and/or unloading of boxes and/or other objects, such as into storage containers or to and from delivery vehicles. In some example embodiments, boxes or objects may be automatically organized and placed onto pallets. Within examples, automating the process of loading/unloading trucks and/or the process of creating pallets from objects for easier storage within a warehouse and/or for transport to and from the warehouse may provide a number of industrial and business advantages.

According to various embodiments, automating the process of loading and/or unloading delivery trucks at the warehouse and/or the process of creating pallets may include the deployment of one or more different types of robotic devices to move objects or perform other functions. In some embodiments, some of the robotic devices can be made mobile by coupling with a wheeled base, a holonomic base (e.g., a base that can move in any direction), or rails on the ceiling, walls, or floors. In additional embodiments, some of the robotic devices may be made fixed within the environment as well. For instance, robotic manipulators can be positioned on elevated bases at different chosen locations within a warehouse.

As used herein, the term "warehouse" may refer to any physical environment in which boxes or objects may be manipulated, processed, and/or stored by robotic devices. In some examples, a warehouse may be a single physical building or structure, which may additionally contain certain fixed components, such as pallet racks or shelving for storing pallets of objects. In other examples, some fixed components may be installed or otherwise positioned within the environment before or during object processing. In additional examples, a warehouse may include multiple separate physical structures, and/or may also include physical spaces that are not covered by a physical structure as well.

Further, the term "boxes" may refer to any object or item that can be placed onto a pallet or loaded onto or unloaded from a truck or container. Further, the term "items" may be used interchangeably with the term "boxes," as well as the term "objects." For example, in addition to rectangular solids, boxes can refer to cans, drums, tires or any other "simple" shaped geometric items. Additionally, boxes may refer to totes, bins, or other types of containers which may contain one or more items for transport or storage. For instance, plastic storage totes, fiberglass trays, or steel bins may be moved or otherwise manipulated by robots within a warehouse. Examples herein may also be applied toward objects other than boxes as well, and toward objects of various sizes and shapes. Additionally, "loading" and "unloading" can each be used to imply the other. For instance, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Within examples, a heterogeneous warehouse robot fleet may be used for a number of different applications. One possible application includes order fulfillment (e.g., for individual customers), in which cases may be opened and individual items from the cases may be put into packaging within boxes to fulfill individual orders. Another possible application includes distribution (e.g., to stores or other warehouses), in which mixed pallets may be constructed containing groups of different types of products to ship to stores. A further possible application includes cross-docking, which may involve transporting between shipping containers without storing anything (e.g., items may be moved from four 40-foot trailers and loaded into three lighter tractor trailers, and could also be palletized). Numerous other applications are also possible.

Referring now to the figures, FIG. 1A depicts a robotic fleet within a warehouse setting, according to an example embodiment. More specifically, different types of robotic devices may form a heterogeneous robotic fleet 100 that may be controlled to collaborate to perform tasks related to the processing of items, objects, or boxes within a warehouse environment. Certain example types and numbers of different robotic devices are shown here for illustration purposes, but robotic fleet 100 may employ more or fewer robotic devices, may omit certain types shown here, and may also include other types of robotic devices not explicitly shown. Additionally, a warehouse environment is shown here with certain types of fixed components and structures, but other types, numbers, and placements of fixed components and structures may be used in other examples as well.

One example type of robotic device shown within robotic fleet 100 is an autonomous guided vehicle (AGV) 112, which may be a relatively small, mobile device with wheels that may function to transport individual packages, cases, or totes from one location to another within the warehouse. Another example type of robotic device is an autonomous fork truck 114, a mobile device with a forklift that may be used to transport pallets of boxes and/or to lift pallets of boxes (e.g., to place the pallets onto a rack for storage). An additional example type of robotic device is a robotic truck loader/unloader 116, a mobile device with a robotic manipulator as well as other components such as sensors to facilitate loading and/or unloading boxes onto and/or off of trucks or other vehicles. For instance, robotic truck unloader 116 may be used to load boxes onto delivery truck 118, which may be parked adjacent to the warehouse. In some examples, movements of delivery truck 118 (e.g., to deliver packages to another warehouse) may also be coordinated with robotic devices within the fleet.

Other types of mobile devices than those illustrated here may also be included as well or instead. In some examples, one or more robotic devices may use different modes of transportation besides wheels on the ground. For instance, one or more robotic devices may be airborne (e.g., quadcopters), and may be used for tasks such as moving objects or collecting sensor data of the environment.

In further examples, the robotic fleet 100 may also include various fixed components that may be positioned within the warehouse. In some examples, one or more fixed robotic devices may be used to move or otherwise process boxes. For instance, a pedestal robot 122 may include a robotic arm elevated on a pedestal that is fixed to the ground floor within the warehouse. The pedestal robot 122 may be controlled to distribute boxes between other robots and/or to stack and unstack pallets of boxes. For example, the pedestal robot 122 may pick up and move boxes from nearby pallets 140 and distribute the boxes to individual AGV's 112 for transportation to other locations within the warehouse.

In additional examples, robotic fleet 100 may employ additional fixed components positioned within a warehouse space. For instance, high density storage racks 124 may be used to store pallets and/or objects within the warehouse. The storage racks 124 may be designed and positioned to facilitate interaction with one or more robotic devices within the fleet, such as autonomous fork truck 114. In further examples, certain ground space may be selected and used for storage of pallets or boxes as well or instead. For instance, pallets 130 may be positioned within the warehouse environment at chosen locations for certain periods of time to allow the pallets to be picked up, distributed, or otherwise processed by one or more of the robotic devices.

Any of the robotic devices described herein may include one or more sensor(s) such as force sensors, proximity sensors, load sensors, position sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, audio sensors, microphones, speakers, radar, cameras (e.g., color cameras, grayscale cameras, and/or infrared cameras), depth sensors (e.g., Red Green Blue plus Depth (RGB-D), lasers, a light detection and ranging (LIDAR) device, a structured-light scanner, and/or a time-of-flight camera), a stereo camera, motion sensors (e.g., gyroscope, accelerometer, inertial measurement unit (IMU), and/or foot step or wheel odometry), and/or range sensors (e.g., ultrasonic and/or infrared), among others. The sensor(s) may provide sensor data to a processor(s) to allow for appropriate interaction of a robotic device with the environment. Additionally, a robotic device may also include one or more power source(s) configured to supply power to various components of the robotic device. Any type of power source may be used such as, for example, a gasoline engine or a battery.

Figure 1B:
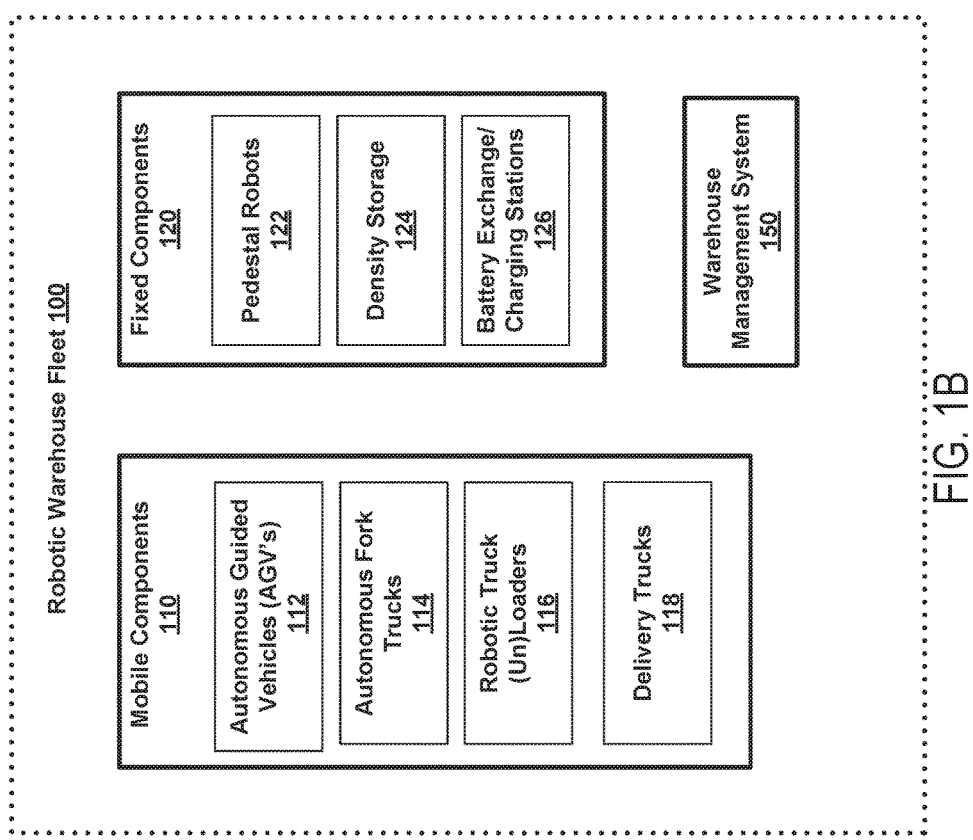
FIG. 1B illustrates a functional block diagram showing components of a robotic fleet, according to an example implementation.

FIG. 1B is a functional block diagram illustrating components of a robotic warehouse fleet 100, according to an example embodiment. The robotic fleet 100 could include one or more of various mobile components, such as AGV's 112, autonomous fork trucks 114, robotic truck loaders/unloaders 116, and delivery trucks 118. The robotic fleet 100 may additionally include one or more fixed components positioned within a warehouse or other environment, such as pedestal robots 122, density storage containers 124, and battery exchange/charging stations 126. In further examples, different numbers and types of the components illustrated within FIG. 1B may be included within a fleet, certain types may be omitted, and additional functional and/or physical components may be added to the examples illustrated by FIGS. 1A and 1B as well. To coordinate actions of separate components, a warehouse management system 150, such as a remote, cloud-based server system, may communicate (e.g., through wireless communication) with some or all of the system components and/or with separate local control systems of individual components.

Within examples, certain of the fixed components 120 may be installed before deployment of the rest of the robotic fleet 100. In some examples, one or more mobile robots may be brought in to map a space before determining placement of certain fixed components 120, such as the pedestal robots 122 or battery exchange stations 126. Once map information is available, the system may determine (e.g., by running simulations) how to layout the fixed components within the space available. In certain cases, a layout may be chosen to minimize the number of fixed components needed and/or the amount of space used by those components. The fixed components 120 and mobile components 110 may be deployed in separate stages or all at once. In additional examples, certain of the mobile components 110 may only be brought in during particular time periods or to complete particular tasks.

In some examples, warehouse management system 150 may include a central planning system that assigns tasks to different robotic devices within fleet 100. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate particular aspects of the geometry and physics of box picking, packing, or storing.

Planning control may also be distributed across individual system components. For example, warehouse management system 150 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

In additional examples, a central planning system may be used in conjunction with local vision on individual robotic devices to coordinate functions of robots within robotic fleet 100. For instance, a central planning system may be used to get robots relatively close to where they need to go. However, it may be difficult for the central planning system to command robots with millimeter precision, unless the robots are bolted to rails or other measured components are used to precisely control robot positions. Local vision and planning for individual robotic devices may therefore be used to allow for elasticity between different robotic devices. A general planner may be used to get a robot close to a target location, at which point local vision of the robot may take over. In some examples, most robotic functions may be position-controlled to get the robots relatively close to target locations, and then vision and handshakes may be used when needed for local control.

In further examples, visual handshakes may enable two robots to identify one another by barcode, QR code, augmented reality tag (AR tag), or other characteristics, and to perform collaborative operations within fleet 100. In additional examples, items (e.g., packages to be shipped) may be provided with visual tags as well or instead, which may be used by robotic devices to perform operations on the items using local vision control. In particular, the tags may be used to facilitate manipulation of the items by the robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual robots within the fleet and/or from external sources. Strategies may then be refined over time to enable the fleet to use less space, less time, less power, less electricity, or to optimize across other variables. In some examples, optimizations may span across multiple warehouses, possibly including other warehouses with robotic fleets and/or traditional warehouses. For instance, global control system 150 may incorporate information about delivery vehicles and transit times between facilities into central planning.

In some examples, a warehouse management system may sometimes fail, such as when a robot gets stuck or when packages get dropped in a location and lost. Local robot vision may also therefore provide robustness by inserting redundancy to handle cases where the warehouse management system fails in part. For instance, as an automatic pallet jack passes and identifies an object, the pallet jack may send information up to a remote, cloud-based server system. Such information may be used to fix errors in central planning, help to localize robotic devices, or to identify lost objects.

In further examples, a warehouse management system may dynamically update a map of the physical environment containing robotic fleet 100 and objects undergoing processing by the robotic devices. In some examples, the map may be continuously updated with information about dynamic objects (e.g., moving robots and packages moved by robots). In additional examples, a dynamic map could contain information on both the current configuration or placement of components within a warehouse (or across multiple warehouses) as well as information about what is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out). In addition, the map could show the current location of all items within the warehouse (or across multiple warehouses).

In additional examples, some or all of the robots may scan for labels on objects at different points within the process. The scans may be used to look for visual tags that may be applied to individual components or specific items to facilitate finding or keeping track of components and items. This scanning may yield a trail of items constantly moving around as the items are manipulated or transported by robots. A potential benefit is added transparency, both on the supplier side and the consumer side. On the supplier side, information about current locations of inventory may be used to avoid overstocking and/or to move items or pallets of items to different locations or warehouses to anticipate demand. On the consumer side, the information about current locations of particular items may be used to determine when a particular package will be delivered with improved accuracy.

FIGS. 2A-2D illustrate several examples of robotic devices that may be included within a robotic warehouse fleet. Other robotic devices which vary in form from those illustrated here as well as other types of robotic devices may also be included.

Figure 2A:
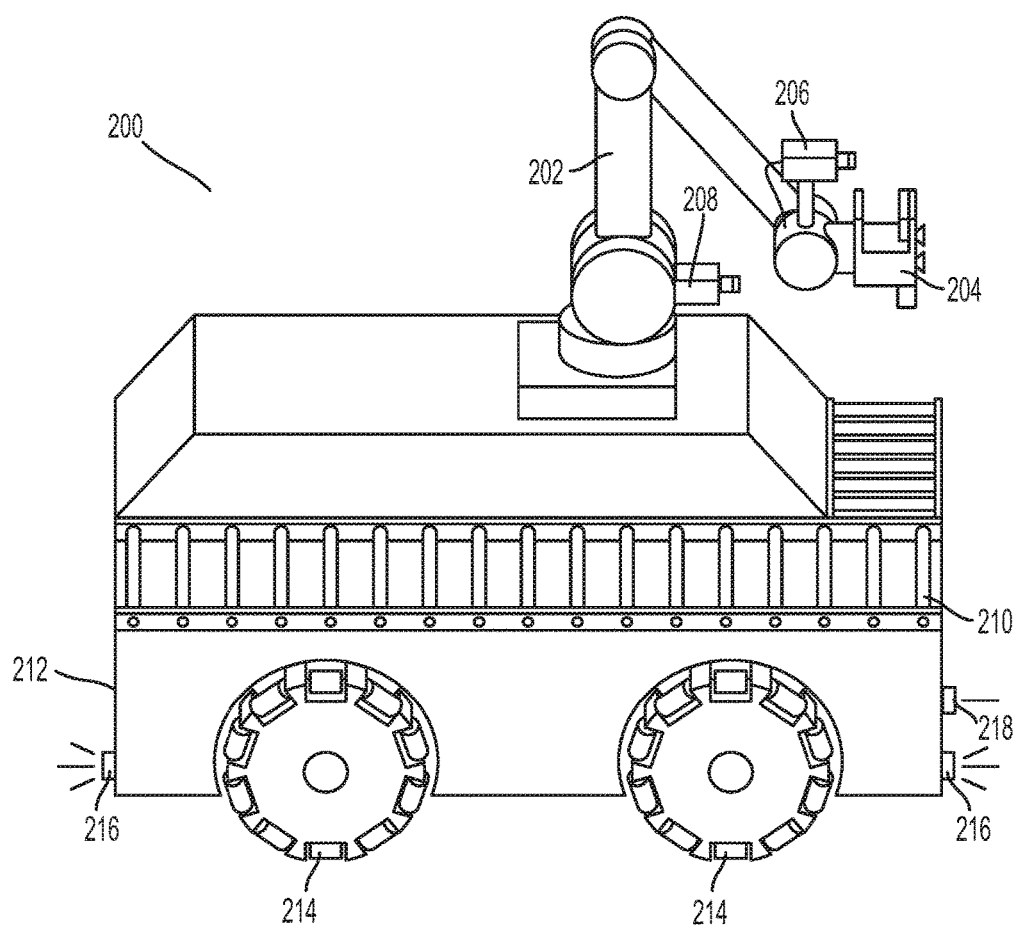
FIG. 2A illustrates a robotic truck unloader, according to an example embodiment.

FIG. 2A illustrates a robotic truck unloader, according to an example embodiment. In some examples, a robotic truck unloader may include one or more sensors, one or more computers, and one or more robotic arms. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

The robotic truck unloader 200 may include a robotic arm 202 with a gripping component 204 for gripping objects within the environment. The robotic arm 202 may use the gripping component 204 to pick up and place boxes to load or unload trucks or other containers. The truck unloader 200 may also include a movable cart 212 with wheels 214 for locomotion. The wheels 214 may be holonomic wheels that allow the cart 212 to move with two degrees of freedom. Additionally, a wrap-around front conveyor belt 210 may be included on the holonomic cart 212. In some examples, the wrap around front conveyer belt may allow the truck loader 200 to unload or load boxes from or to a truck container or pallet without having to rotate gripper 204.

In further examples, a sensing system of robotic truck unloader 200 may use one or more sensors attached to a robotic arm 202, such as sensor 206 and sensor 208, which may be two-dimensional (2D) sensors and/or 3D depth sensors that sense information about the environment as the robotic arm 202 moves. The sensing system may determine information about the environment that can be used by a control system (e.g., a computer running motion planning software) to pick and move boxes efficiently. The control system could be located on the device or could be in remote communication with the device. In further examples, scans from one or more 2D or 3D sensors with fixed mounts on a mobile base, such as a navigation sensors 216, safety sensor 218, and one or more sensors mounted on a robotic arm, such as sensor 206 and sensor 208, may be integrated to build up a digital model of the environment, including the sides, floor, ceiling, and/or front wall of a truck or other container. Using this information, the control system may cause the mobile base to navigate into a position for unloading or loading.

In further examples, the robotic arm 202 may be equipped with a gripper 204, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

The truck unloader 200 may additionally include a motor, which may be an electric motor powered by electrical power, or may be powered by a number of different energy sources, such as a gas-based fuel or solar power. Additionally, the motor may be configured to receive power from a power supply. The power supply may provide power to various components of the robotic system and could represent, for example, a rechargeable lithium-ion or lead-acid battery. In an example embodiment, one or more banks of such batteries could be configured to provide electrical power. Other power supply materials and types are also possible.

Figure 2B:
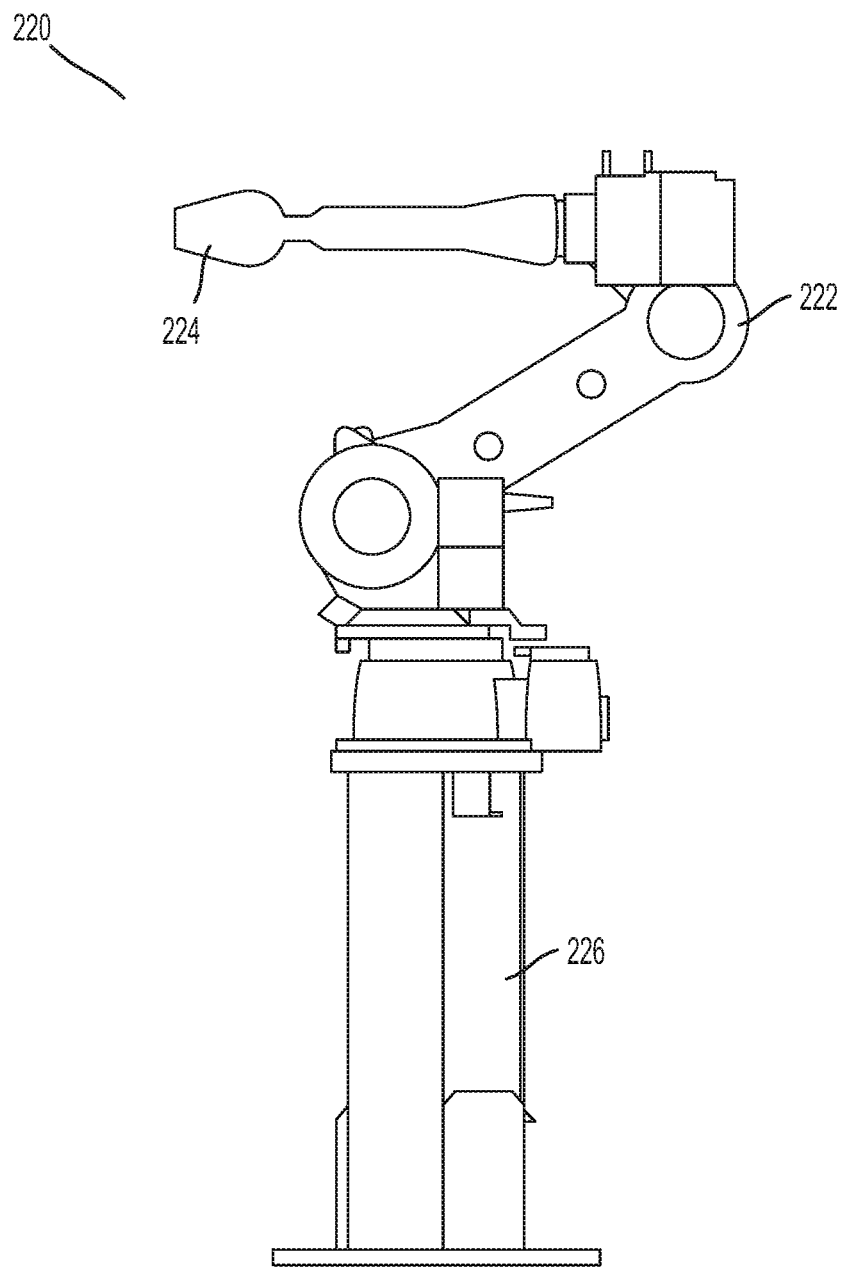
FIG. 2B illustrates a robotic arm on a pedestal, according to an example embodiment.

FIG. 2B illustrates a robotic arm on a pedestal, according to an example embodiment. More specifically, pedestal robot 220 may be positioned within an environment such as a warehouse environment and used to pick up, move, and/or otherwise manipulate objects within reach. In some examples, the pedestal robot 220 may be specialized for heavy lifting without requiring batteries to operate. The pedestal robot 220 may include a robotic arm 222 with an end-effector-mounted gripper 224, which may be of the same type as the robotic manipulator 202 and gripper 204 described with respect to the robotic truck unloader 200. The robotic arm 222 may be mounted on a pedestal 226, which may allow the robotic arm 222 to easily pick up and move nearby packages, such as to distribute packages between different mobile robots. In some examples, the robotic arm 222 may also be operable to construct and/or deconstruct pallets of boxes. In additional examples, the pedestal 226 may include an actuator to allow a control system to change the height of the robotic arm 222.

In further examples, a bottom surface of the pedestal robot 220 may be a pallet-shaped structure. For instance, the bottom surface may have dimension and shape roughly equivalent to other pallets used for object transport or storage within a warehouse. By shaping the bottom of the pedestal robot 220 as a pallet, the pedestal robot 220 may be picked up and moved to different locations within a warehouse environment by a pallet jack or different type of autonomous fork truck. For instance, when a delivery truck arrives at a particular docking port of the warehouse, a pedestal robot 220 may be picked up and moved to a location closer to the delivery truck to more efficiently process boxes coming from or going to the delivery truck.

In additional examples, the pedestal robot 220 may also include one or more visual sensors to identify boxes and/or other robotic devices within the vicinity of the pedestal robot 220. For instance, a control system of the pedestal robot 220 or a global control system may use sensor data from sensors on the pedestal robot 220 to identify boxes for the robotic arm 222 and gripper 224 of the pedestal robot 220 to pick up or manipulate. In further examples, the sensor data may also be used to identify mobile robotic devices in order to determine where to distribute individual boxes. Other types of robotic fixed manipulation stations may also be used within a heterogeneous robotic fleet as well.

Figure 2C:
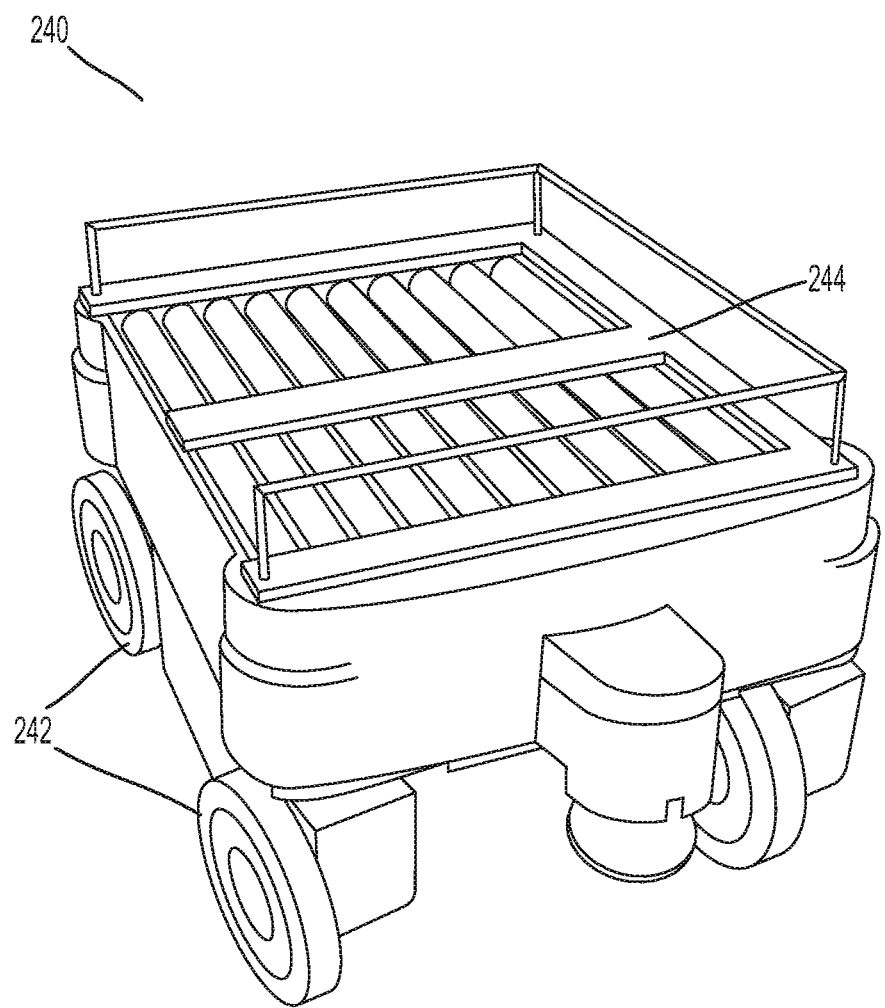
FIG. 2C illustrates an autonomous guided vehicle, according to an example embodiment.

FIG. 2C shows an autonomous guided vehicle (AGV), according to an example embodiment. More specifically, AGV 240 may be a relatively small, mobile robotic device that is capable of transporting individual boxes or cases. The AGV 240 may include wheels 242 to allow for locomotion within a warehouse environment. Additionally, a top surface 244 of the AGV 240 may be used to places boxes or other objects for transport. In some examples, the top surface 244 may include rotating conveyors to move objects to or from the AGV 240. In additional examples, the AGV 240 may be powered by one or more batteries that can be quickly recharged at a battery charging station and/or exchanged for fresh batteries at a battery exchange station. In further examples, the AGV 240 may additionally include other components not specifically identified here, such as sensors for navigation. AGVs with different shapes and sizes also may be included within a robotic warehouse fleet, possibly depending on the types of packages handled by a warehouse.

Figure 2D:
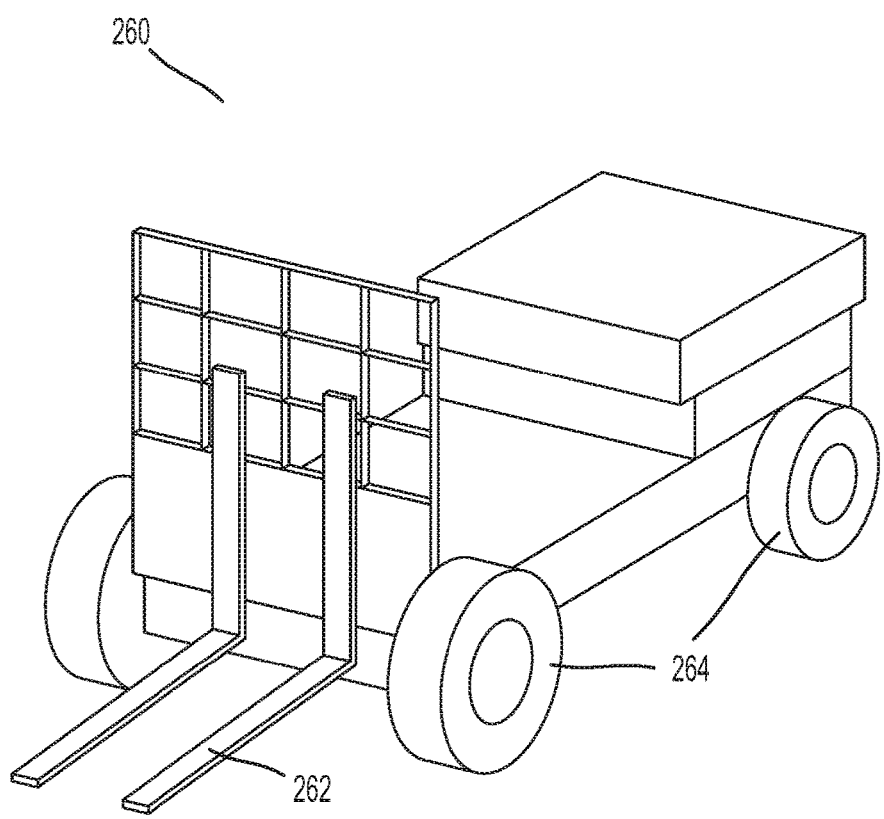
FIG. 2D illustrates an autonomous fork truck, according to an example embodiment.

FIG. 2D shows an autonomous fork truck, according to an example embodiment. More specifically, autonomous fork truck 260 may include a forklift 262 for lifting and/or moving pallets of boxes or other larger materials. In some examples, the forklift 262 may be elevated to reach different racks of a storage rack or other fixed storage structure within a warehouse. The autonomous fork truck 260 may additionally include wheels 264 for locomotion to transport pallets within the warehouse. In additional examples, the autonomous fork truck may include a motor and power supply as well as a sensing system, such as those described with respect to robotic truck unloader 200. The autonomous fork truck 260 may also vary in size or shape from the one illustrated in FIG. 2D.

III. Example Systems

Figure 3A:
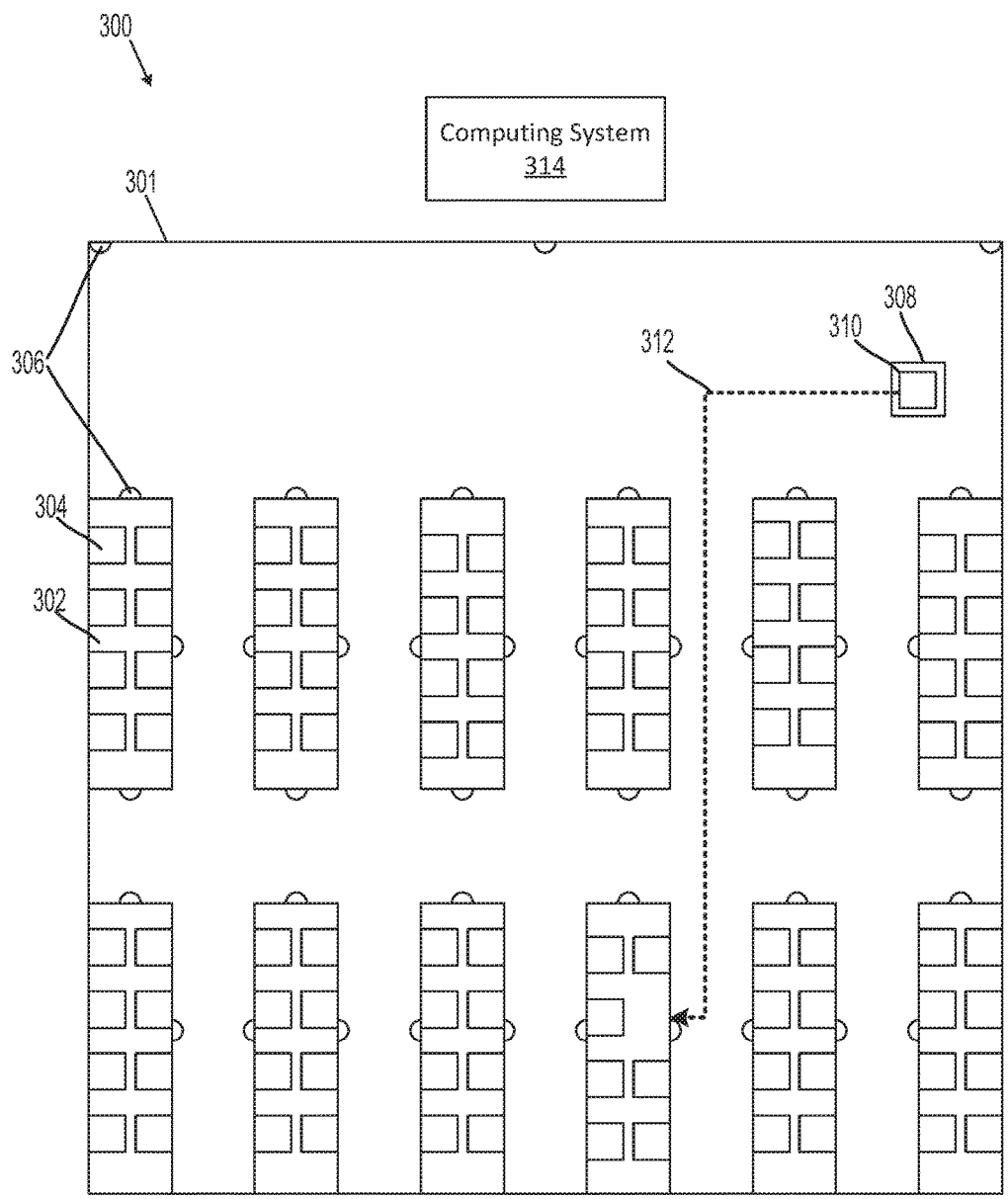
FIG. 3A illustrates an overhead view of a system operating within an environment, according to an example implementation.

FIG. 3A illustrates an example system 300 operating within an environment 301, shown in an overhead view. The environment 301 may be a warehouse, building, or other location in which objects are stored and/or moved from one location to another. Environment 301 may include one or more shelves 302, which may include a plurality of objects 304 stored thereon. Environment 301 may also include a plurality of cameras 306 positioned within the warehouse, such as on the walls, shelves or structures of the environment 300, or on one or more robotic devices operating within the environment (not shown).

In some examples, system 300 may also include a mobile robotic device 308. Mobile robotic device 308 may transport a movable platform 310 through environment 301. Shown in FIG. 3A, mobile robotic device may transport movable platform 310 along a route 312. Route 312 may be predetermined, or may be dynamically generated and/or changed.

The movable platform 310 of system 300 may be configured to support one or more objects as the movable platform is transported within the environment. For example, movable platform 310 may be a pallet or other structure configured for easy access, storage, and movement by one or more robotic devices. Movable platform 310 may include a visual identifier, such as a barcode or QR code. Alternatively or in addition, movable platform 310 may include a non-visual identifier, such as an RFID chip. The visual and/or non-visual identifiers may be used to identify the platform and for one or more other purposes described herein.

The one or more objects supported by the movable platform may include boxes and/or other objects. As the objects are transported within the environment, one or more objects may be added to or removed from the movable platform, either intentionally or by accident (i.e., an object mistakenly falling off the movable platform). This may cause the shape of the movable platform and/or supported objects to change. This change in shape may be captured by one or more cameras, and may be used by a centralized computing system to indicate that a significant event has occurred.

The plurality of cameras 306 located within environment 301 may be positioned such that there is complete or near-complete coverage of the full environment, or at least a number of designated locations within the environment. The designated locations may be high traffic areas, which may allow a greater number of cameras to view each robotic device, movable platform, and/or object that passes through. As such, multiple cameras may have overlapping views of many points in the environment 301. In some examples, cameras may be positioned such that two or more of them have non-overlapping fields of view, to provide greater overall coverage of the environment using the same number of cameras. In some examples, the plurality of cameras may be positioned on each shelf 302, at predetermined locations on the walls or near the edges of the environment, and/or on one or more robotic devices (not shown) operating within the environment. Each camera may be configured to capture a continuous or near-continuous feed, such that any movement of an object within the camera's field of view is captured.

Each camera 306 may be configured to capture one or more images and transmit them to a central computing system 314. Computing system 314 may be a component or part of system 300, and may be a warehouse management system or other centralized system for controlling and monitoring actors within environment 301. Computing system 314 may receive the images from each camera 306, and may process the images to carry out one or more functions.

Figure 4:
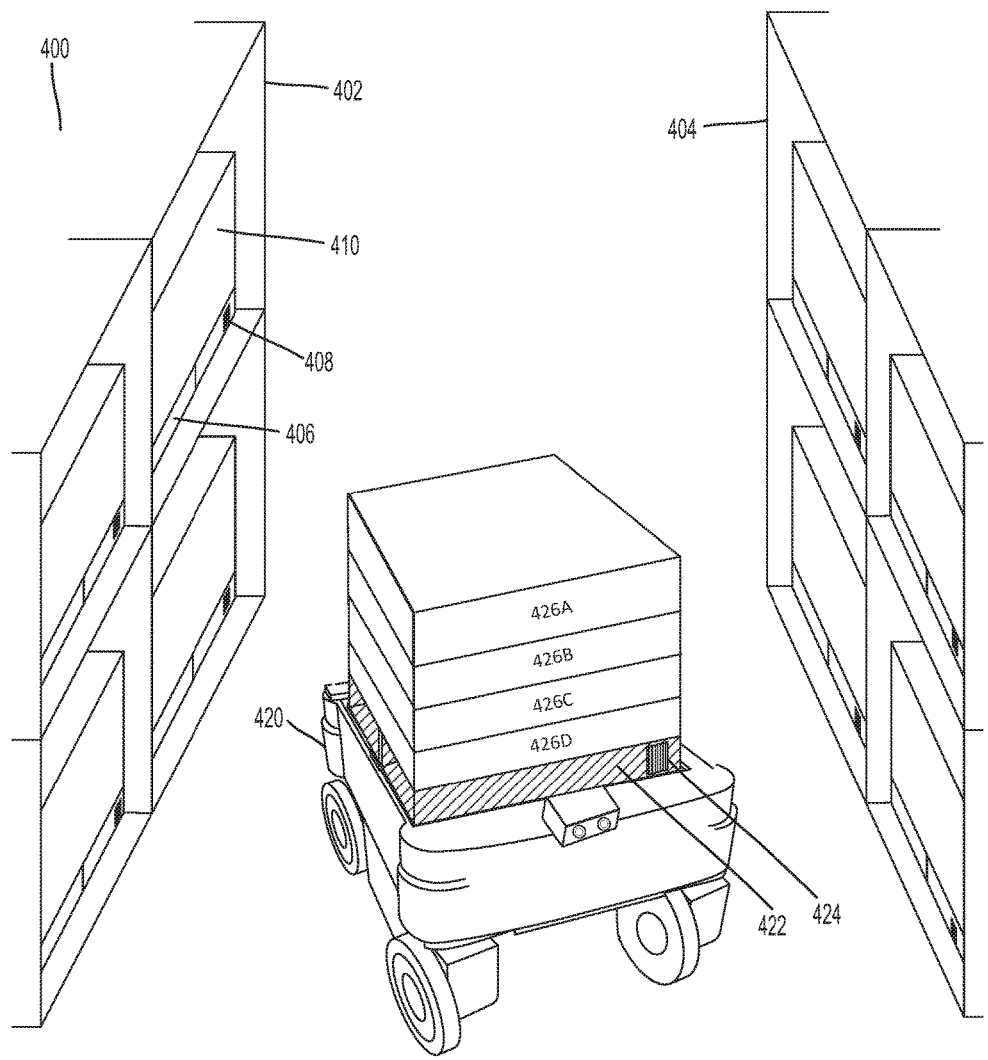
FIG. 4 illustrates a captured image of a movable platform in a warehouse environment, according to an example implementation.

FIG. 4 illustrates an example image 400 captured by a camera 306 in the environment 301. Image 400 includes two shelves 402 and 404. The shelves 402 and 404 include a plurality of stored movable platforms 406 supporting one or more stored objects 410. Each stored movable platform 406 includes a corresponding identifier 408. Image 400 also includes a robotic device 420, transporting a movable platform 422 having an identifier 424. In FIG. 4, identifier 408 and identifier 424 are barcodes. However other identifiers such as RFID, NFC, and/or others may be used to identify movable platforms 406 and 422 respectively. Also included are objects 426A-D which are being supported by movable platform 422.

In some examples, computing system 314 may be configured to select one or more of the plurality of images received from the cameras 306, such that the selected images include movable platform 310. Selecting the one or more images may include analyzing the received images to determine which images in particular include the movable platform. This analysis may include scanning each image to identify one or more characteristics, such as the visual identifier corresponding to the movable platform (e.g., visual identifier 424 in image 400), the particular robotic device transporting the movable platform, and/or the contents, shape, orientation, or other characteristic of the objects supported by the movable platform.

In some examples, a non-visual identifier may be used in part to determine and select one or more particular images. For instance, a movable platform supporting an object may include an RFID chip, NFC tag, or other mode of identification. The non-visual identifier may store a location of the movable platform at a particular time, and in some examples may communicate the identification and/or location locally (e.g., to a reader, scanner, other sensor). In some examples, the non-visual identifier may be configured to communicate remotely (e.g., to a WMS), directly or indirectly. One or more cameras having respective fields of view of the location at this time may be expected to capture one or more images of the movable platform. In this way, the non-visual identifier corresponding to the movable platform may be used to determine and select one or more images that include a view of the identified movable platform. Other methods and techniques that make use of non-visual identifiers to select images may be used as well.

Selecting one or more images may also include the computing system 314 selecting images from at least two perspectives of the movable platform. For instance, computing system may receive several images and may select a subset of those images making sure that at least two angles of the movable platform are included.

In some examples, the computing system 314 may use a location of the camera 306, robotic device 308, or movable platform 310 to determine which images to select. For instance, computing system 314 may have information about the location, orientation, and field of view of each camera, and may use this information in combination with knowledge of the location of the movable platform 310 to determine which images from which cameras will likely contain the movable platform 310. Further, the computing system 314 may have information about the probable future location of the movable platform 310, and may use this information to identify images containing the platform. For instance, computing system 314 may transmit a task to robotic device 308 instructing the robotic device 308 to transport movable platform 310 from one location to another along path 312. Based on this task, computing system 314 may be able to predict when and where the movable platform will be, and may use this information to select images from particular cameras within the environment.

Figure 3B:
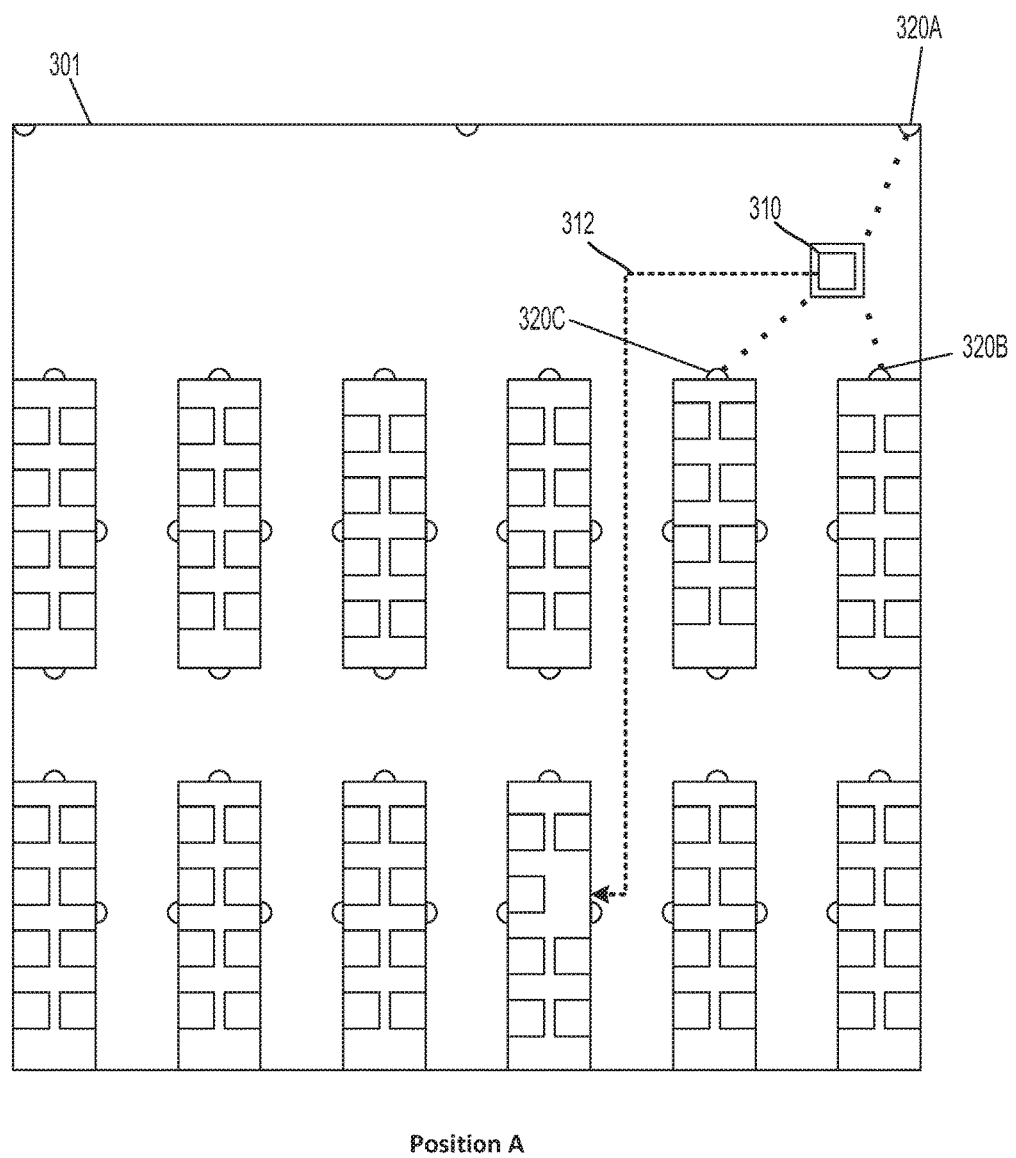
FIGS. 3B-D illustrate a movable platform as it is transported within an environment, according to an example implementation.
Figure 3C:
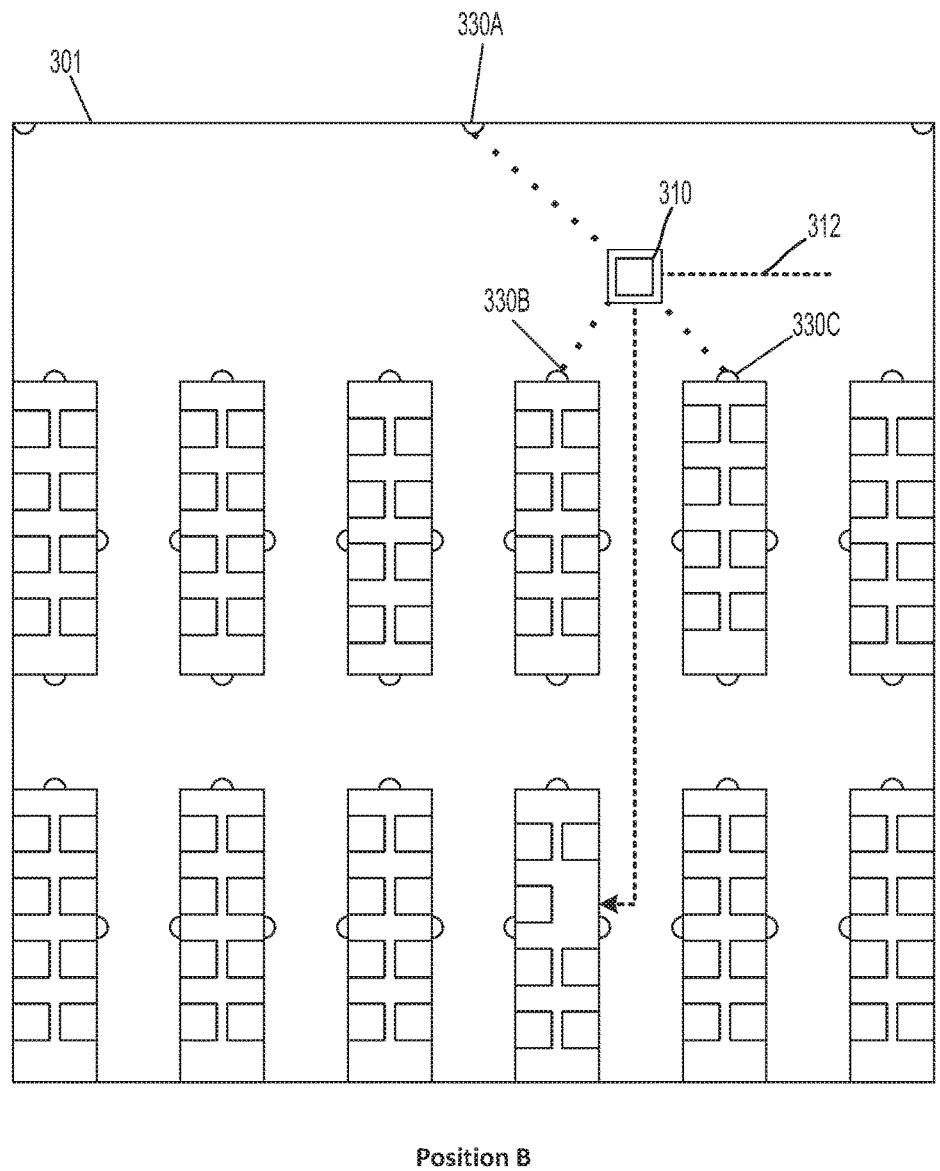
Figure 3D:
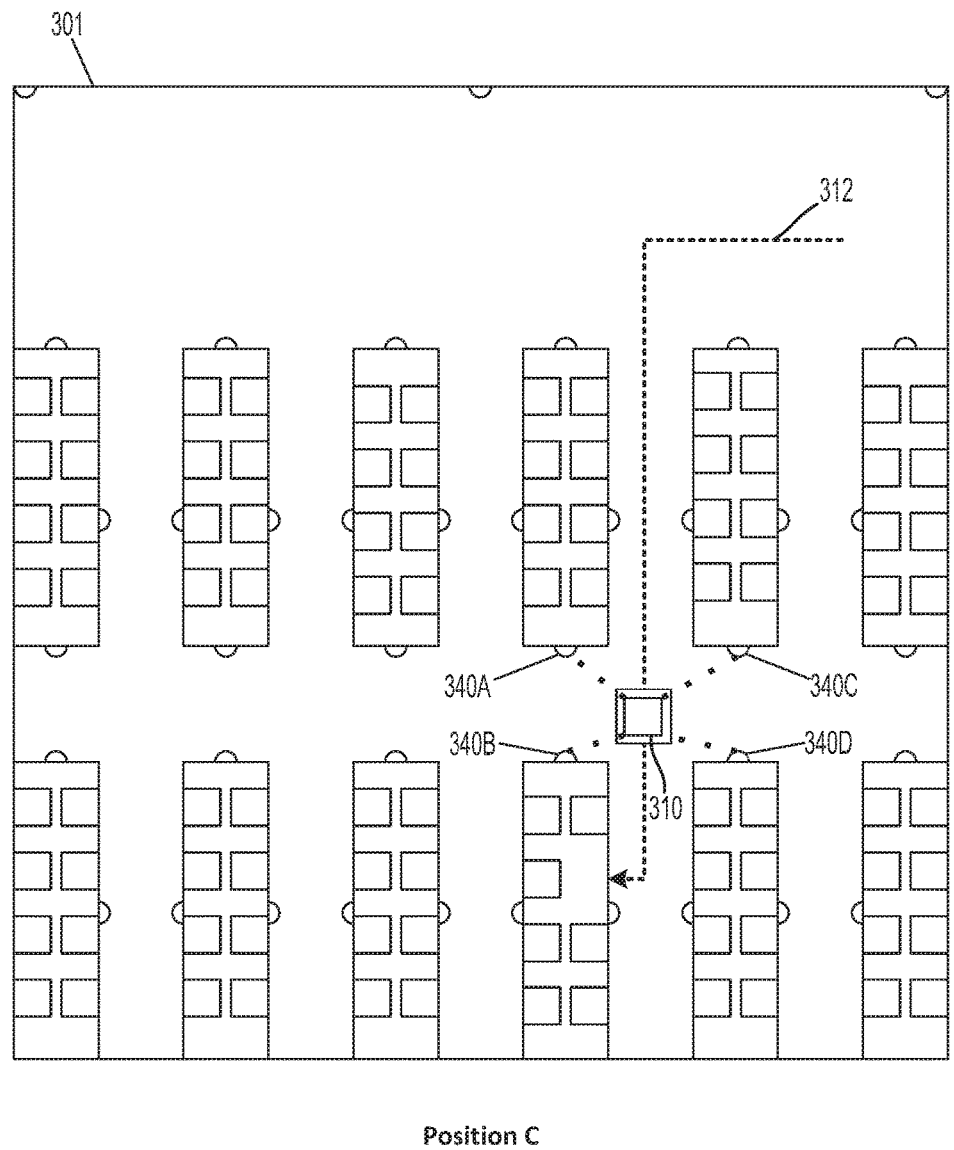

FIGS. 3B-D illustrate movable platform 310 being transported through environment 301 along path 312. FIG. 3B is a snapshot at a first point in time in which the movable platform is a position A. At this first point in time, cameras 320A, 320B, and 320C have a view of movable platform 310.

FIG. 3C illustrates a snapshot of a second point in time, later than the first, at which the movable platform has been transported to position B. At position B, cameras 330A, 330B, and 330C have a view of the movable platform.

FIG. 3D illustrates a snapshot of a third point in time, later than the second, in which the movable platform has been transported to position C. At position C, cameras 340A, 340B, 340C, and 340D have a view of the movable platform.

In some examples, computing system 314 may be configured to generate a three-dimensional model of the movable platform supporting one or more objects based on the selected one or more images. For instance, when movable platform 310 is located at position A, images from cameras 320A, 320B, and 320C including the movable platform may be received by computing system 314, selected, and then used to generate a three-dimensional model. The three-dimensional model may be generated by extracting shape, size, depth, color, material, orientation, and other information related to the movable platform from the selected images.

In some examples, computing system 314 may receive and select images captured during a first time interval. This time interval may be determined so that it is long enough for a sufficient number of images to be captured, while being short enough to avoid any significant changes (e.g., movements, adding or removing objects, unexpected changes, etc.).

Figure 5A:
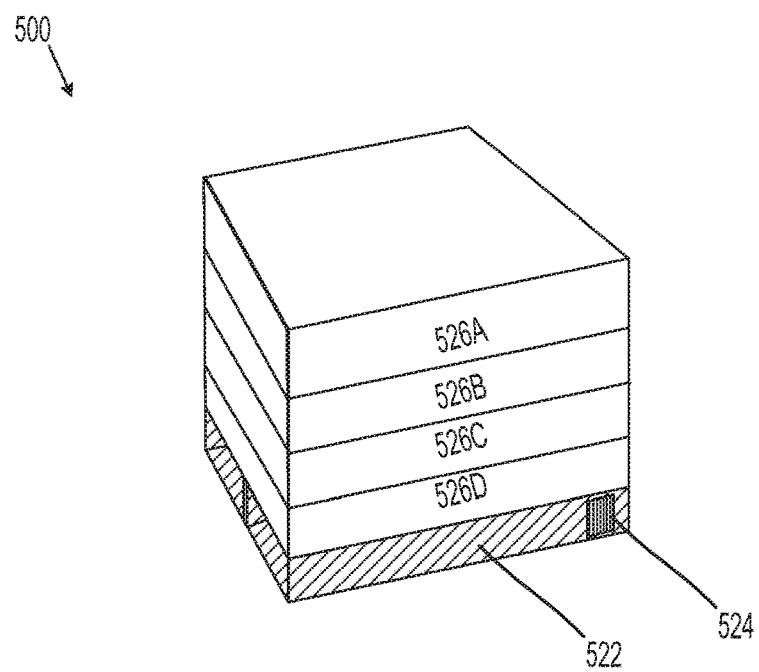
FIG. 5A illustrates a three-dimensional model of a movable platform, according to another example implementation.

The generated three-dimensional model may include the one or more of (i) the movable platform itself, (ii) the one or more objects supported by the movable platform, and (iii) a robotic device that transports the movable platform. In some cases, the three dimensional model may also include background information, such as the shelves, walls, robotic device, and other objects within the environment, FIG. 5A illustrates an example three-dimensional model showing movable platform 502 having visual identifier 504, and supporting objects 510A-D.

Figure 5B:
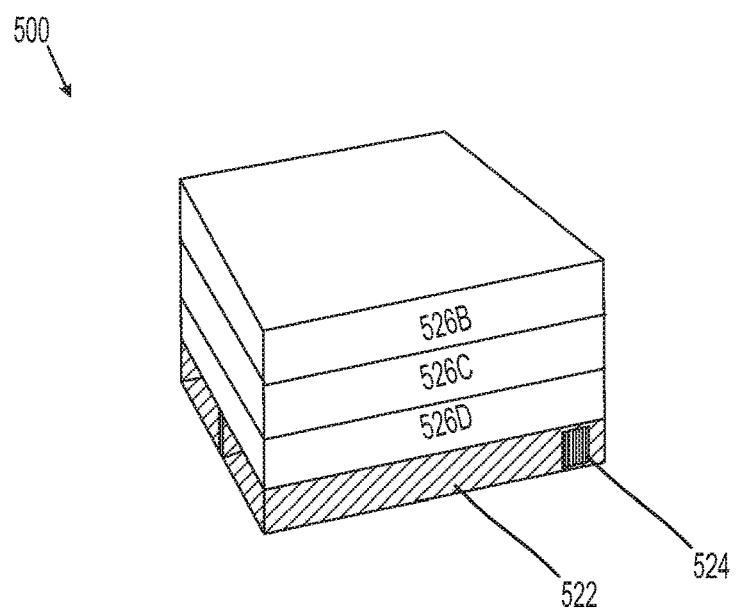
FIG. 5B illustrates an updated three-dimensional model of the movable platform of FIG. 5A FIGS. 6A and 6B illustrate a user interface displaying the three-dimensional model at first and second points in time respectively, according to an example implementation.

Computing system 314 may also be configured to update the three-dimensional model. FIG. 5B, for example, illustrates an updated three-dimensional model of the movable platform and objects of FIG. 5A, in which object 526A has been removed. The updates to the three-dimensional model may be based on images captured by some or all of the same cameras that were used to generate the initial three-dimensional model, or may be based on images captured from a different set of cameras. Further, the update may be based on images captured during a second time interval that occurs later than the first time interval.

In one example, a pallet carrying several boxes may be unloaded by a truck and may be transported into a warehouse. The warehouse may have cameras located near the loading dock, which may captured images of several angles of the pallet and boxes. These images may be captured over a first time interval, and may be used to generate a three-dimensional model of the pallet and boxes. The pallet may then be moved through the warehouse to a second location, where a box may be removed. Images captured at this location and during this second time interval may be used to update the three-dimensional model. The old three-dimensional model may be stored, so that a later review of the history of the pallet and boxes can be viewed.

In some examples, updating the three-dimensional model may include computing system 314 receiving a plurality of images, selecting one or more images that include a first side of movable platform 310, and updating the corresponding first side of the three-dimensional model. As such, updating the three-dimensional model may include updating only a portion of the model. This may occur in practice where a movable platform is transported along a route having a camera arrangement such that only one side of the platform is viewed. Computing system 314 may receive images having a view of only one side of the platform, and may update the corresponding side of the model.

Computing system 314 may further be configured to update the three-dimensional model continuously, near-continuously, and/or at regular or irregular intervals. In some examples, updates may occur at regular intervals such as every 10 seconds. In other examples, the model may be updated at irregular intervals, based on movement or activity. For instance, as a movable platform is transported through an environment, updates may be carried out in rapid succession. However, where a platform is stationary on a shelf, the corresponding three-dimensional model may not be updated for long periods of time. In other cases, a movable platform that is transported near a denser arrangement of cameras may be updated more rapidly than a movable platform transported in a less camera-dense area. In this way, the time intervals between updates to a given three-dimensional model may be based on movement of a platform, likelihood of an action occurring that includes the movable platform, the path taken by a platform as it is transported, the arrangement of cameras within the environment, or various other factors.

Computing system 314 may also be configured to present the three-dimensional model via a display of a user interface of the computing system. The user interface may include a screen, keyboard, mouse, and/or other mechanism used for input and output of information.

Figure 6A:
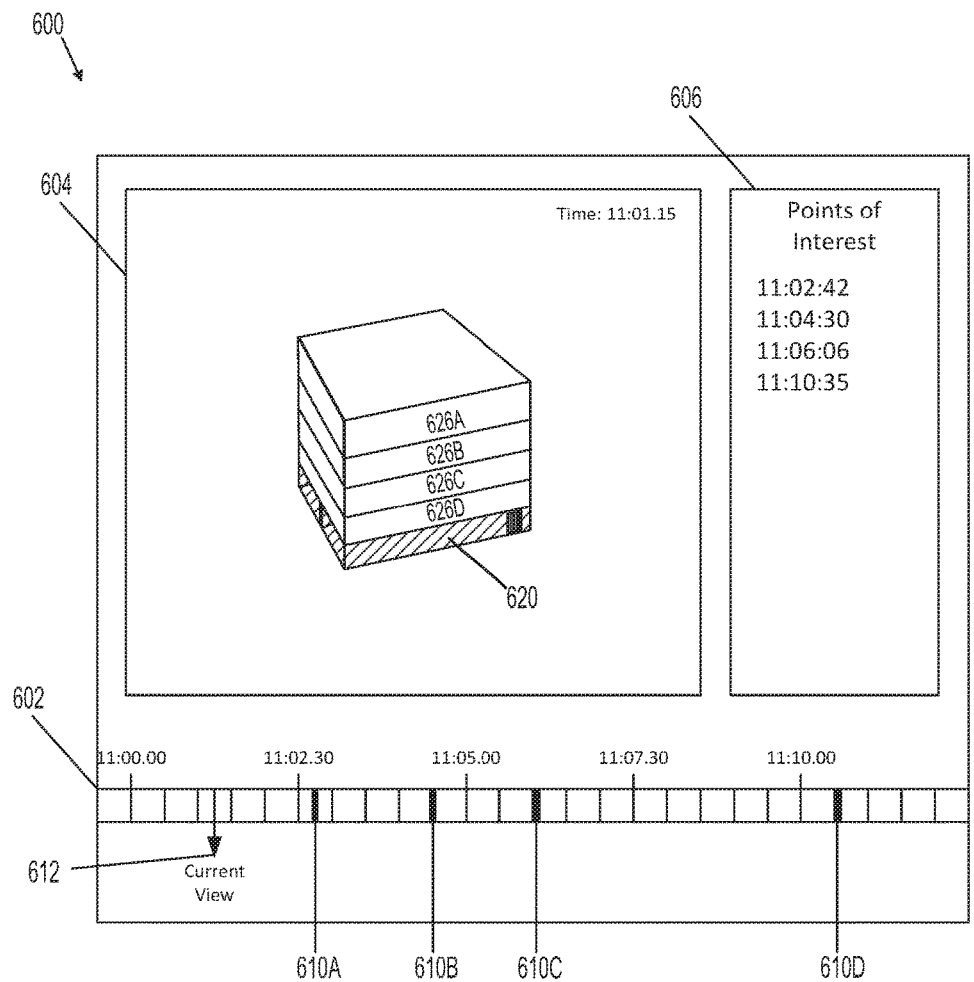
Figure 6B:
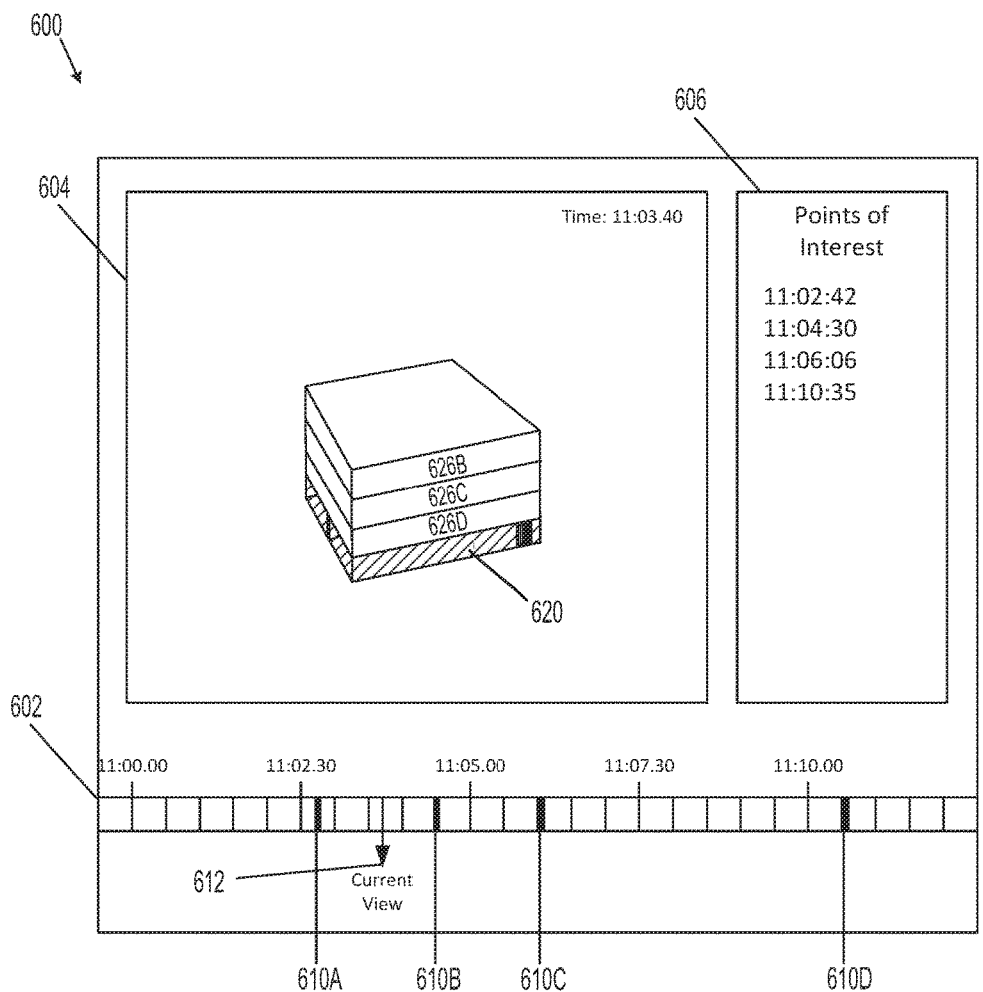

Further, computing system 314 may be configured to provide an option, via the user interface, to view a history of the three-dimensional model including first and second time intervals such that the three-dimensional model remains in a fixed position on the display. FIGS. 6A and 6B illustrate an example display 600, including a timeline 602, a viewing area 604, and a point of interest area 606.

In FIG. 6A, the viewing area 604 shows a three-dimensional model of a movable platform 620 supporting objects 626A-D. The three-dimensional model is shown centered in the viewing area 604, but may alternatively be centered or displayed anywhere within the viewing area. Further, some or all of the timeline 602, viewing area 604, and points of interest area 606 may be rearranged on the screen or removed from the display altogether. FIG. 6A shows one illustrative embodiment.

In some examples, the user interface may provide the option to scroll back and forth on the timeline, to view the three-dimensional model at different points in time. This may be done by dragging the "current view" indicator 612 on the timeline 602 from one location to another. Alternatively, the display may automatically scroll through the timeline to display the three-dimensional model. In other examples, a user may be able to enter a selected point in time into a search box, for example, and/or may be able to choose a selected point in time or range of times in some other way. FIG. 6B shows the display when the "current view" indicator 612 has been dragged to a second position later than the first position. Figure A displays the model at a time of 11:01.15, while FIG. 6B displays the model at a time shortly after that at 11:03.40. In FIG. 6B, the three-dimensional model shows that object 626A has been removed.

In some examples, display 600 may allow for the display a history of the three-dimensional model, such that the three-dimensional model may be viewed at any point in time for which images of a given movable platform were captured. As such, the history of the three-dimensional model may include the model during a first time interval during which the model was initially generated, as well as any subsequent time interval.

Timeline 602 may include markers 610A-D that may indicate points in time on the timeline 602 for which significant actions took place. For example, in FIGS. 6A and 6B, marker 610A may indicate a point in time at which object 626A was removed from movable platform 620.

In some examples, computing system 314 may determine markers 610A-D. Markers 610A-D may be determined based various factors including (i) the shape of the movable platform and supported objects, and any changes that occur over time, and (ii) information stored by the computing system regarding expected locations, shapes, contents, or other characteristics of the movable platform and supported objects. For instance, a marker may be determined based on a comparison of three-dimensional models at two different points in time. This comparison may allow the computing system to determine significant actions such as when an object has been removed or rearranged on the movable platform (both intentionally and unintentionally), when an object has been deformed, when there has been unintended contact with the environment, or any other change. In some examples, computing system 314 may compare the three-dimensional model at two adjacent time intervals, while in other examples computing system 314 may compare non-adjacent time intervals.

In some examples, computing system 314 may compare an expected shape of the movable platform and supported objects to an actual shape. Computing system 314 may then responsively indicate that the expected and actual shapes lack a threshold extent of similarity. Computing system 314 may include information about the expected shape of a given movable platform and the objects supported thereon. This information may change over time, as objects are added or removed and actions are carried out in the environment. Computing system 314 may thus maintain and/or update information about the expected shape of the movable platform and supported objects. Computing system 314 may compare this expected shape to an actual shape, which may be determined based on the three-dimensional model of the movable platform and supported objects. This comparison may be performed multiple times, such as each time the three-dimensional model is updated, and may allow computing system 314 to indicate every instance where the expected shape of the movable platform and supported objects is different than the actual shape.

The markers described above have been used for illustrative purposes only. It is also contemplated herein that other types and forms of indicators may be used to make a user aware of interesting or significant events that occur over time as a movable platform is transported within an environment. For instance, different colors may be used to indicate when an event has occurred, flashing lights or icons may be used, or selected images or three-dimensional models may be added to a list of significant events that can be viewed separately or independently from the full history.

In some examples, the viewing area 604 may include only a display of the three-dimensional model of the movable platform 620 and supported objects 626A-D. When the current view indicator 612 is dragged forward and backward in time, the three-dimensional model may remain in a fixed position within the viewing area 604. As such, it may appear that a camera is fixed on the three-dimensional model, or that image stabilization has been performed with the three-dimensional model as the focus, while the environment changes around it. This may allow a user to quickly scroll forward and backward in the timeline to view significant events without needing to search the screen at each moment in time for the three-dimensional model.

While FIGS. 6A and 6B show the three-dimensional model in the viewing area 604 without any background items, in some examples there may be background items displayed as well. In these examples, the three-dimensional model may be expanded to include certain amounts of the volume surrounding the movable platform itself, including background objects, structures, robotic devices, and/or other items. Further, the movable platform may remain in a fixed position while the background items change, such that the display shows the motion in the surrounding volume relative to the fixed movable platform. The inclusion of background items into the three-dimensional model may provide more information about how and why a significant event occurred, such as an unexpected deformation of an object. For instance, marker 610B may correspond to an event in which the robotic device transporting movable platform 620 accidentally ran into a shelf, causing object 626B to be deformed. When the current view indicator 612 is dragged to marker 610B, the viewing area may display both the three-dimensional model as well as any background items (such as the shelf that movable platform 620 ran into), which may help explain when, where, how, and why an object has been deformed.

Figure 7:
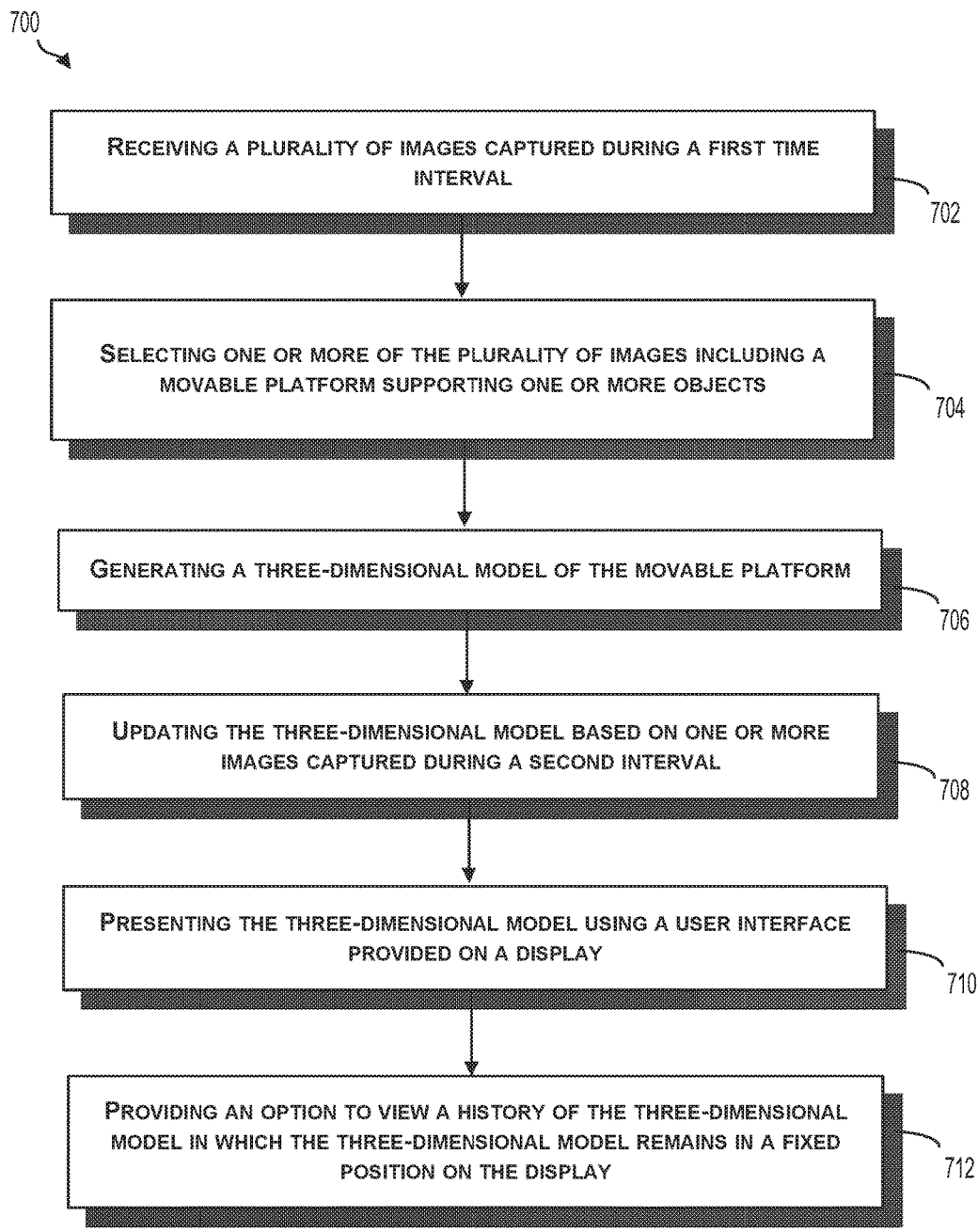
FIG. 7 illustrates a flowchart of an example method, according to an example implementation.

FIG. 7 shows a flowchart of an example method 700 according to an example embodiment. Method 700 may be carried out by any of the devices or systems described herein, such as robotic devices shown in FIGS. 2A-2D, and the systems described with reference to FIGS. 3-6.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 7. Where used, program code can be stored on any type of computer-readable medium, for example, such as a storage device including a disk or hard drive.

In addition, each block of the flowchart shown in FIG. 7 may represent circuitry that is wired to perform the specific logical functions in the process. Unless specifically indicated, functions in the flowchart shown in FIG. 7 may be executed out of order from that shown or discussed, including substantially concurrent execution of separately described functions, or even in reverse order in some examples, depending on the functionality involved, so long as the overall functionality of the described method is maintained.

At block 702 of FIG. 7, method 700 may include receiving a plurality of images captured during a first time interval. The plurality of images may be captured by a plurality of cameras located in an environment, including cameras affixed to structures within the environment as well as cameras affixed to or mounted on robotic devices operating within the environment. The first time interval may be any length of time needed to capture a sufficient number of images for later processing and analysis.

At block 704, method 700 may include selecting one or more of the plurality of images including a movable platform supporting one or more objects. This may also include selecting an image that includes the movable platform being transported. The captured plurality of images may have many images that do not include a movable platform. Thus, block 704 may include selecting a subset of the captured plurality that do include the movable platform. This act of selection may include analyzing the plurality of images to detect a visual identifier corresponding to the movable platform or supported objects. Selecting the images may also or alternatively include using information about the present and future location of the movable platform, combined with the locations and orientations of the plurality of cameras located in the environment. The predicted path and/or locations of the movable platform may be used to select particular cameras located along the path, which may then be used to narrow the plurality of images to a selected subset received from those cameras.

At block 706, method 700 may include generating a three-dimensional model of the movable platform. The three-dimensional model may be generated based on the selected images, in addition to other information that may be known about the movable platform and objects supported thereon. For instance, the type of object may be used to determine certain characteristics, such as approximate size, shape, etc. This information may be used along with the selected images to generate a three-dimensional model.

In some examples the selected images may be selected so that they include two or more different angles of the movable platform. It may be beneficial for the selected images to include as many angles of the movable platform as possible, so that a more accurate model can be generated.

At block 708, method 700 may include updating the three-dimensional model based on one or more images captured during a second interval. The second time interval may be later than the first interval. In some examples, the movable platform may be transported within the environment and images of the platform may be captured by various cameras at various times. Over time, the movable platform and supported objects may change, and the cameras may capture these changes. The second time interval may be determined so that a sufficient number of images can be captured and processed to update the three-dimensional model.

In some examples, a "batch" system may be used. Images may be captured over a period of time (i.e., a batch of images) and then the model may be updated based on all of those images. Alternatively, the three-dimensional model may be updated based on changes determined from a single image or set of images. For instance, where only one side of the movable platform is visible by cameras located in the environment, the model may be updated to reflect the changes to that side. And as such, the three-dimensional model may be only partially updated or modified, such that different perspective views of the three-dimensional model may be more up to date than others (i.e., some views may be comparatively old).

At block 710, method 700 may include presenting the three-dimensional model using a user interface provided on a display. The three dimensional model may be displayed such that it can be rotated and/or spun around to provide a view of the model from multiple different angles. In this manner, a user may be able to focus on a particular side of the model that is of interest, such as the side from which objects are loaded and unloaded.

At block 712, method 700 may include providing an option to view a history of the three dimensional model in which the three-dimensional model remains in a fixed position on the display. The history of the three dimensional model may include the model as it was during the first time interval as well as during the second time interval. In some examples, the user interface may provide the ability to scroll backward and forward in time, to view how the three dimensional model has changed over time, while maintaining the three dimensional model in the same position on the display. It may also include maintaining the same view of the three dimensional model over time as well.

Displaying the model in a fixed position may allow a user to easily compare the model over time and quickly evaluate any changes that occur. For instance, where the movable platform is in motion, images may be captured by multiple cameras such that the platform is in different positions in each image. Displaying the three-dimensional model in a fixed position may allow a user to more easily compare the movable platform over time, and may be more helpful to a user than a series of images of the movable platform from different perspectives and cameras.

In some examples, method 700 may further include indicating one or more points of interest in the history of the movable platform. For instance, points of interest may include each time that a significant change occurs, such as adding or removing an object from the movable platform. They may also include each time that an expected shape of the movable platform lacks a threshold extent of similarity from an actual shape of the movable platform, which may occur when an object is unintentionally added, removed, or deformed. These points of interest may be determined based on comparisons of the three dimensional model over time, and/or based on information about the movable platform and supported objects stored by a computing system monitoring the environment.

In some examples, method 700 may also include updating the three dimensional model based on images captured during third, fourth, and/or subsequent time intervals. Further, significant changes that occur between these time intervals may also be indicated on the user interface.

IV. Example Variations

In some examples, the plurality of cameras configured to capture images within the environment may be positioned in predetermined locations, such as at the end of a shelf or on a wall. In other examples, the plurality of cameras may include cameras mounted on robotic devices operating in the environment, such as AGVs that may transport movable platforms. Each camera (whether stationary or not) may have a corresponding location associated with it, which may be used by the computing system to carry out one or more functions described herein. For instance, the location of the cameras may be used to select particular cameras that are along the planned route for a given robotic device carrying a movable platform.

In further examples, the computing system may store an expected location of a given movable platform. The computing system may indicate moments in time during which the movable platform is not in an expected location, which may be determined based on images received from the plurality of cameras.

The display of the user interface may show the three-dimensional model as it changes over time. In some examples, this display may also show background objects and/or one or more robotic devices operating on the movable platform and supported objects. The computing system may flag one or more points in time during which a robotic device operates on the movable platform and supported objects, so that a user can quickly scroll through these points in time. This may allow a user to quickly diagnose any errors or issues that may have occurred.

The concepts of the present disclosure have been described with respect to a movable platform supporting one or more objects. However, in some examples these concepts may be applied to an object itself, instead of the entire platform. For example, a computing system may present a three dimensional model of a particular object, and may provide the ability to scroll through the history of that object.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   receiving, from a camera located in an environment, a plurality of images captured during a first time interval;
   selecting an image from the plurality of images, wherein the selected image includes a movable platform supporting an object;
   generating, based on the selected image, a three-dimensional model of the movable platform supporting the object;
   updating the three-dimensional model based on an additional image captured during a second time interval, wherein the second time interval begins later than the first time interval, and wherein (i) a first state of the three-dimensional model corresponding to the first time interval and (ii) a second state of the three-dimensional model corresponding to the second time interval are stored in the three-dimensional model to represent a history thereof;
   presenting the three-dimensional model using a user interface provided on a display; and
   providing an option, by the user interface, to view the history of the three-dimensional model, the history including the first time interval and the second time interval, such that, when the three-dimensional model changes between the first state and the second state during a viewing of the history, the three-dimensional model remains in a fixed position on the display.

2. The method of claim 1, wherein the selected image depicts the movable platform supporting the object when the movable platform is being transported within the environment.

3. The method of claim 1, wherein selecting the image from the plurality of images comprises:
   determining a target visual identifier corresponding to the movable platform;
   determining an image of the plurality of images that depicts the target visual identifier; and
   selecting the determined image.

4. The method of claim 1, wherein selecting the image from the plurality of images comprises:
   determining a target non-visual identifier corresponding to the movable platform;
   determining, based on the target non-visual identifier, an image of the plurality of images; and
   selecting the determined image.

5. The method of claim 1, further comprising determining an expected location of the movable platform, wherein selecting the image from the plurality of images comprises selecting the image based on the expected location of the movable platform.

6. The method of claim 5, wherein the expected location of the movable platform is determined based on a task assigned to a robotic device transporting the movable platform.

7. The method of claim 1, wherein the image captured during the first time interval and the additional image captured during the second time interval are captured by cameras that have non-overlapping fields of view.

8. The method of claim 1, wherein two images are selected from the plurality of images such that the selected images include two sides of the movable platform.

9. The method of claim 1, wherein updating the three-dimensional model based on the additional image captured during the second time interval comprises:
receiving, from the camera, the additional image captured during the second time interval;
determining that the received additional image includes a first side of the movable platform, corresponding to a first side of the three-dimensional model; and
updating the first side of the three-dimensional model.

10. The method of claim 1, further comprising:
determining, for a particular point in time, an expected shape of the movable platform supporting the object;
determining, based on the three-dimensional model, for the particular point in time, an actual shape of the movable platform supporting the object;
determining that the expected shape and the actual shape lack a threshold extent of similarity; and
responsive to determining that the actual shape and the expected shape lack a threshold extent of similarity, presenting, by the user interface, an indication of the particular point in time.

11. The method of claim 1, further comprising:
updating the three-dimensional model based on a third image captured during a third time interval that begins later than the second time interval, wherein a third state of the three-dimensional model corresponding to the third time interval is stored in the three-dimensional model to represent the history thereof,
wherein providing the option to view the history of the three-dimensional model comprises presenting the three-dimensional model on the display such that the display scrolls through showing the first, second, and third states of the three-dimensional model during the first, second, and third time intervals, respectively.

12. The method of claim 1, wherein providing the option to view the history of the three-dimensional model comprises presenting the three-dimensional model on the display, wherein the three-dimensional model includes an item in a volume surrounding the movable platform, such that, when the three-dimensional model changes between the first state and the second state during the viewing of the history, the item is displayed moving relative to the movable platform and the movable platform is displayed in the fixed position on the display.

13. The method of claim 1, further comprising:
updating the three-dimensional model at fixed time intervals; and
providing, on the display, an indication that the three-dimensional model has changed by more than a threshold amount between adjacent time intervals.

14. A system comprising:
a movable platform configured to support an object;
a camera located in an environment; and
a computing system, wherein the computing system is configured to:
receive, from the camera, a plurality of images captured during a first time interval;
select an image from the plurality of images, wherein the selected image includes the movable platform;
generate, based on the selected image, a three-dimensional model of the movable platform supporting the object;
update the three-dimensional model based on an additional image captured during a second time interval, wherein the second time interval begins later than the first time interval, and wherein (i) a first state of the three-dimensional model corresponding to the first time interval and (ii) a second state of the three-dimensional model corresponding to the second time interval are stored in the three-dimensional model to represent a history thereof;
present the three-dimensional model using a user interface provided on a display of the computing system; and
provide an option, by the user interface, to view the history of the three-dimensional model, the history including the first time interval and the second time interval, such that, when the three-dimensional model changes between the first state and the second state during a viewing of the history, the three-dimensional model remains in a fixed position on the display during a viewing of the history.

15. The system of claim 14, wherein the computing system is further configured to determine an expected location of the movable platform, wherein the computing system is configured to select the image from the plurality of images based on the expected location of the movable platform.

16. The system of claim 15, further comprising:
a robotic device configured to transport the movable platform within the environment,
wherein the computing system is further configured to transmit an instruction to the robotic device to transport the movable platform, and wherein the expected location of the movable platform is determined based on the instruction transmitted to the robotic device.

17. The system of claim 14, wherein the computing system is further configured to:
determine, for a particular point in time, an expected shape of the movable platform supporting the object;
determine, based on the three-dimensional model, for the particular point in time, an actual shape of the movable platform supporting the object;
determine that the expected shape and the actual shape lack a threshold extent of similarity; and
responsive to determining that the actual shape and the expected shape lack a threshold extent of similarity, present, via the user interface, an indication of the particular point in time.

18. The system of claim 14, wherein the computing system is further configured to:
update the three-dimensional model based on a third image captured during a third time interval that begins later than the second time interval, wherein a third state of the three-dimensional model corresponding to the third time interval is stored in the three-dimensional model to represent the history thereof,
wherein providing the option to view the history of the three-dimensional model comprises presenting the three-dimensional model on the display such that the display scrolls through showing the first, second, and third states of the three-dimensional model during the first, second, and third time intervals respectively.

19. The system of claim 14, wherein the three-dimensional model includes an item in a volume surrounding the movable platform, and wherein the computing system is configured to provide the option to view the history of the three-dimensional model by presenting the three-dimensional model on the display such that, when the three-dimensional model changes between the first state and the second state during the viewing of the history, the item is displayed moving relative to the movable platform and the movable platform is displayed in the fixed position on the display.

20. The system of claim 14, wherein the computing system is further configured to:
   update the three-dimensional model at fixed time intervals; and
   provide, on the display, an indication that the three-dimensional model has changed by more than a threshold amount between adjacent time intervals.

21. A non-transitory computer-readable medium having stored thereon program instructions that when executed cause a computing device to perform a set of acts comprising:
   receiving, from a camera located in an environment, a plurality of images captured during a first time interval;
   selecting an image from the plurality of images, wherein the selected image includes a movable platform supporting an object;
   generating, based on the selected image, a three-dimensional model of the movable platform supporting the object;
   updating the three-dimensional model based on an additional image captured during a second time interval, wherein the second time interval begins later than the first time interval, and wherein (i) a first state of the three-dimensional model corresponding to the first time interval and (ii) a second state of the three-dimensional model corresponding to the second time interval are stored in the three-dimensional model to represent a history thereof;
   presenting the three-dimensional model using a user interface provided on a display of the computing device; and
   providing an option, by the user interface, to view the history of the three-dimensional model, the history including the first time interval and the second time interval, such that, when the three-dimensional model changes between the first state and the second state during a viewing of the history, the three-dimensional model remains in a fixed position on the display.

* * * * *